US006942407B2

United States Patent
Chou

(10) Patent No.: US 6,942,407 B2
(45) Date of Patent: Sep. 13, 2005

(54) WRIST REST CAPABLE OF VERTICALLY STORING UP A KEYBOARD

(75) Inventor: Kuan-Nan Chou, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 10/773,040

(22) Filed: Feb. 6, 2004

(65) Prior Publication Data

US 2005/0175389 A1 Aug. 11, 2005

(51) Int. Cl.⁷ .............................................. B41J 29/00
(52) U.S. Cl. ...................... 400/715; 400/691; 248/118
(58) Field of Search .............................. 400/715, 691, 400/692, 693; 248/118, 118.1, 118.3, 918; 361/683

(56) References Cited

U.S. PATENT DOCUMENTS

| 5,346,164 A | * | 9/1994 | Allen | 248/118 |
| 6,290,411 B1 | * | 9/2001 | Shirai | 400/681 |
| 6,648,534 B2 | * | 11/2003 | Chen | 400/715 |

FOREIGN PATENT DOCUMENTS

DE         203 17 278 U1  *  2/2004

* cited by examiner

Primary Examiner—Leslie J. Evanisko

(57) ABSTRACT

A wrist rest capable of vertically storing up keyboard includes a wrist rest, at least a movable piece and at least one wall plate. The movable piece is kept in the interior of the wrist rest body in way of being able to slide out of the wrist rest body and is pivotally connected to the wrist rest body. The wall plate is pivotally connected to the movable piece and is able to rotate a preset angle and held in position. The keyboard can rest against the wall plate after the wall plate has been rotated to the preset angle.

7 Claims, 5 Drawing Sheets

WRIST REST CAPABLE OF VERTICALLY STORING UP A KEYBOARD

BACKGROUND OF THE INVENTION

1. Field of the Invention

The present invention relates to a wrist rest for a keyboard, which has the capability of storing up keyboard vertically.

2. Brief Description of Related Art

FIG. 1 illustrates a conventional keyboard 11 with a wrist rest 13 only provides the functionality of wrist resting for comfort of the user during the keyboard 11 being operated. However, both the keyboard 11 and the wrist rest 13 have a lot of areas to occupy quite a large space of the desktop and indirectly cause the inconvenience to the user during works being done on the desk.

FIG. 2 illustrates another conventional keyboard, which is feasible for being stored up easily. At least one support part 15a is installed at the case of the keyboard 15 and the support part 15a has a split fork-like structure, which forms a two-point support. Therefore, this allows the keyboard 15 to be stored vertically by way of the support of the support part 15a. Since the support part 15a of the keyboard 15 needs to be a split fork-like structure, it is inevitable that the thickness of the keyboard 15 has to be increased because of due to the support part 15a. This is one of the major shortcomings of the prior art.

SUMMARY OF THE INVENTION

A main object of the present invention is to provide a device capable of storing up the keyboard vertically so as to reduce the space occupied by the keyboard.

In order to achieve the preceding object, a wrist rest capable of storing up a keyboard vertically according to the present invention includes a wrist rest body, at least one movable piece and at least one wall plate. The movable piece can be kept in the interior of the wrist rest body and also is able to slide out of the wrist rest body with the movable piece being pivoted with the wrist rest body. The rotating wall plate, which is pivotally connected to the slide piece, rotates to a preset angle and is held in position so that the keyboard can rest against the wall plate.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
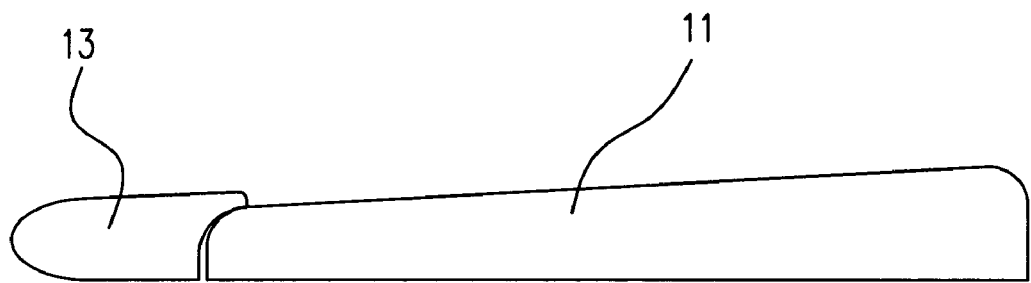
FIG. 1 is a perspective view of a conventional keyboard with a wrist rest.
Figure 2:
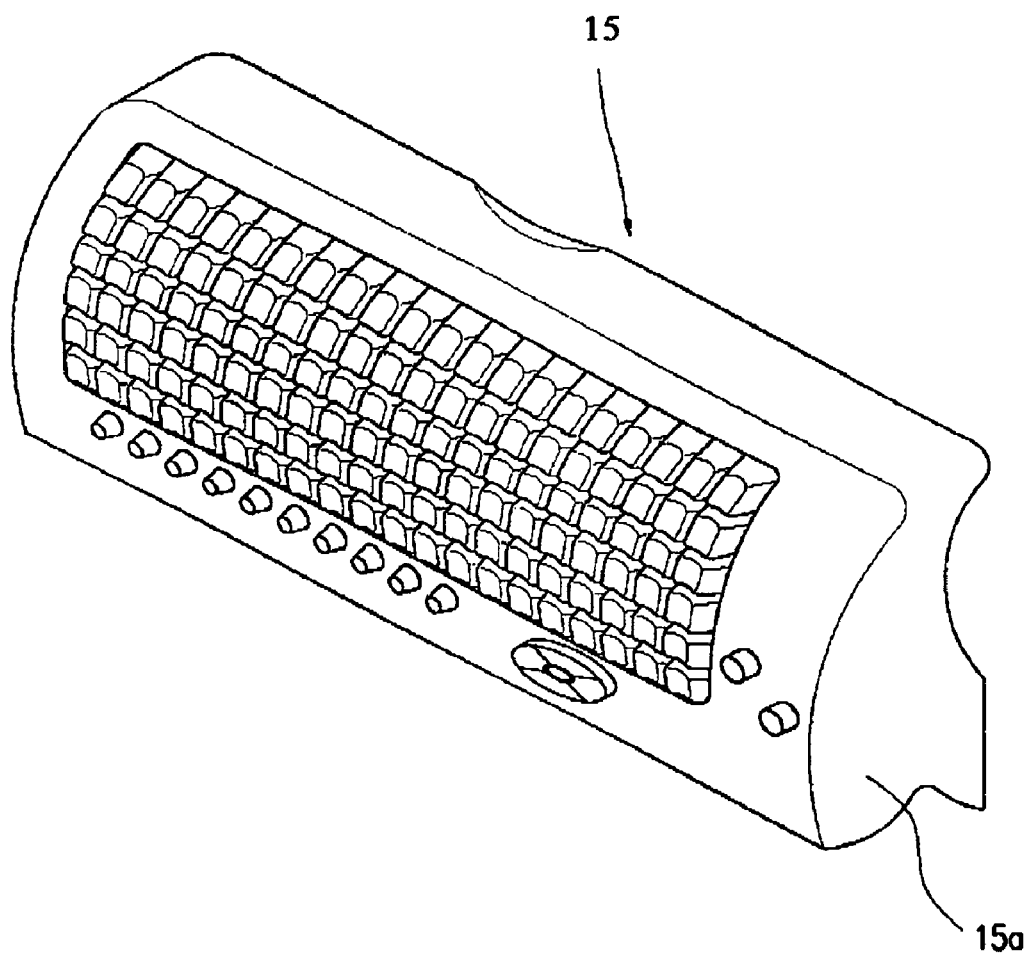
FIG. 2 is a perspective view of another conventional keyboard feasible for being stored up.
Figure 3:
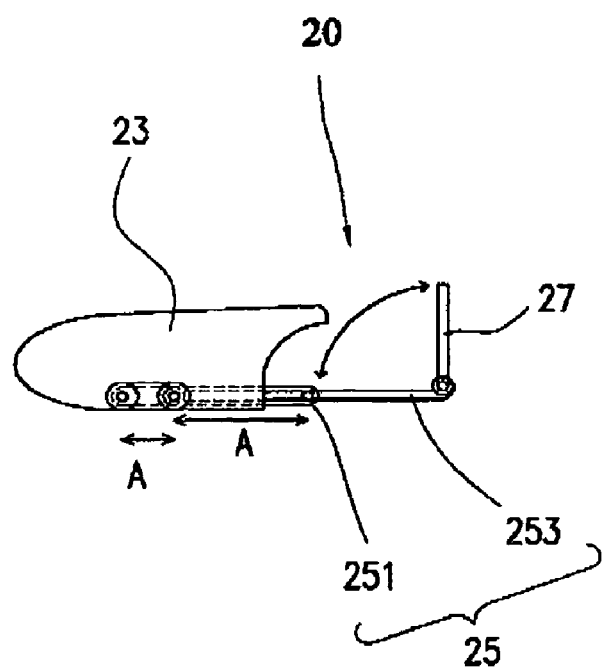
FIG. 3 is a plan view of a wrist rest for storing up a keyboard vertically in a first embodiment of the present invention.
Figure 4:
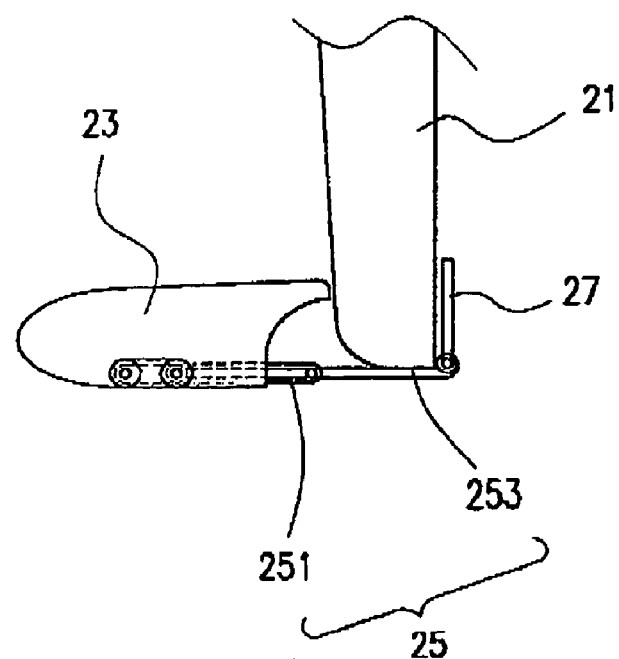
FIG. 4 is a plan view illustrating the wrist rest shown in FIG. 3 in a state of the keyboard being stored up therein.

FIG. 3 shows a wrist rest for storing up keyboard vertically in accordance with the present invention in the first embodiment thereof while FIG. 4 shows the wrist rest in a state of the keyboard having been stored up therein. The wrist rest 20 for the keyboard 21 is capable of storing up the keyboard vertically and mainly comprises a wrist rest body 23, at least one slide piece 25 and a wall plate 27. In the first embodiment of the present invention, the slide piece 25 slides out horizontally in the direction of A to the exterior from the wrist rest body 23. When the user operates the keyboard 21, the wrist rest body 23 functions as a wrist rest while the wall plate 27 and the first slide piece 251 with the second slide piece 253, which are used for the implementation of the slide piece 25, are kept in the interior of the wrist rest body 23. However, when the keyboard 21 is not operated by the user, the first slide piece 251 and the second slide piece 253 can be slid out of the wrist rest body 23 horizontally to the exterior. At least a distance between the first slide piece 251 and second slide piece 253 can be kept after both the slide pieces 251, 253 sliding out and the distance is the thickness of the keyboard 21. The wall plate 27, which is pivotally connected to the second slide piece 253, can then be rotated a preset angle such as 90° and held fixedly. As a result, the keyboard 21 can be lifted to a vertical position and placed between the wall plate 27 and the wrist rest body 23 in a way of resting against the wall plate 27.

Figure 5:
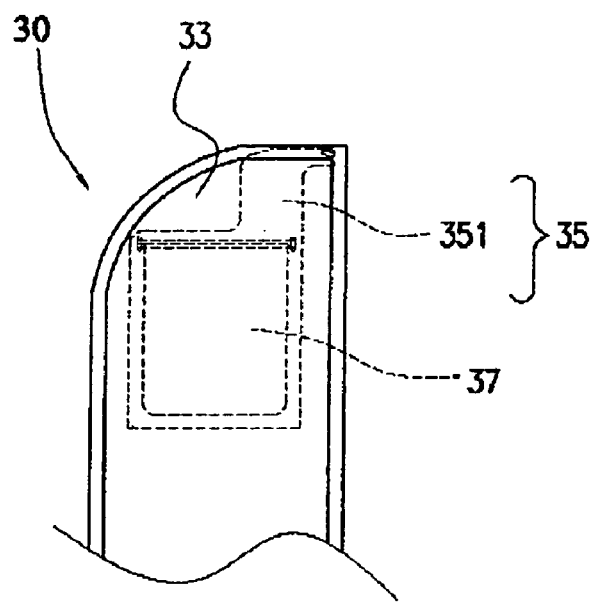
FIG. 5 is a plan view of a wrist rest for storing up a keyboard vertically in a second embodiment of the present invention.
Figure 6:
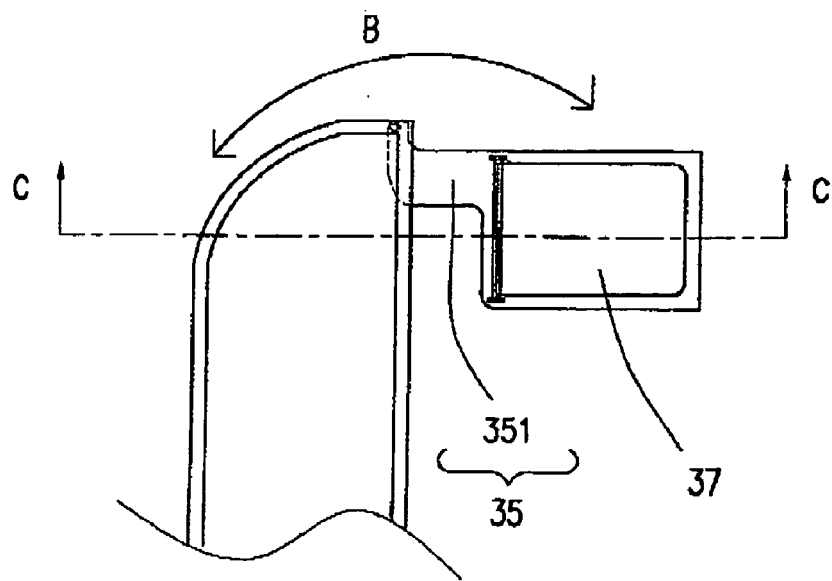
FIG. 6 is a side view illustrating the wrist rest shown in FIG. 5 with a wrist rest body being pivotally moved out.
Figure 7:
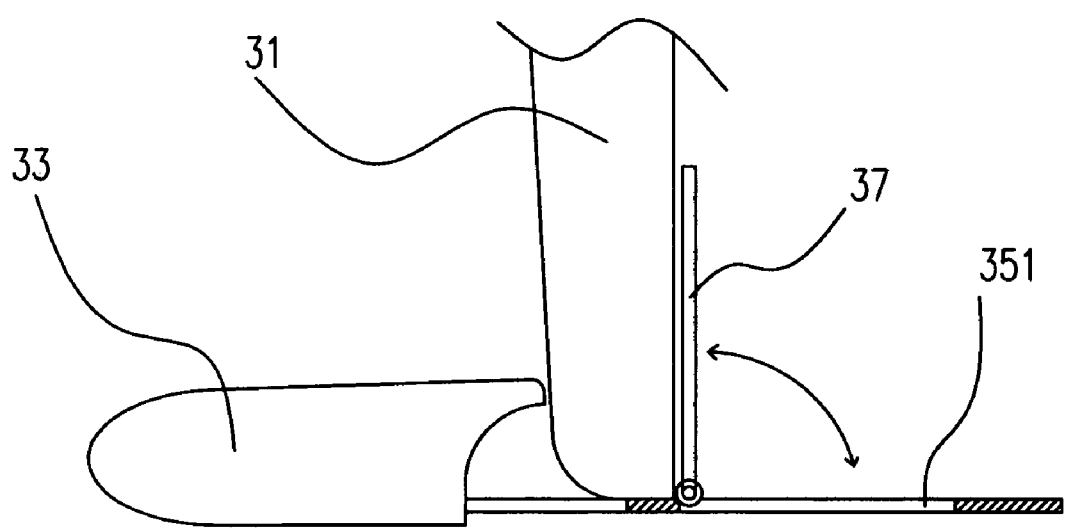
FIG. 7 is a sectional view along line C—C shown in FIG. 6 illustrating a state of the keyboard being stored up in the second embodiment.

FIG. 5 shows a wrist rest for storing up a keyboard vertically in accordance with the present invention in a second embodiment thereof while FIG. 6 shows the wrist rest body in FIG. 5 being pivotally moved out and FIG. 7 is a sectional view along line C—C shown in FIG. 6 illustrate the keyboard in a state of being stored up. The wrist rest 30, which is capable of storing up a keyboard 31 vertically mainly comprises a wrist rest body 33, at least one movable piece 35 and at least one wall plate 37. In the second embodiment of the present invention, the movable piece 35 is rotated pivotally out from the wrist rest body 37 to the exterior in the direction B shown FIG. 6. Once the user operates the keyboard 31, the wrist rest body 37 will function as a wrist rest while the wall plate 37 and the pivot piece 351 for the implementation of the movable piece 35 are kept in the interior of the wrist rest body 33. However, when the user is not operating the keyboard 31, the pivot piece 351 can be rotated out pivotally in the direction of B from the wrist rest body 33 to the exterior. A distance between the pivot piece 351 and the wrist rest body 33 can be kept after sliding outward to accommodate the thickness of the keyboard 31. The wall plate 37, which is pivotally connected to the pivot piece 351, can then be rotated to a preset angle such as 90° and fixedly held there. Next, the keyboard 31 can be lifted to a vertical position and placed in between the wall plate 37 and the wrist rest body 33 to rest against the wall plate 37. The movable piece 35 can be installed respectively in the interior of the wrist rest body 33 at two lateral sides thereof. Hence, the respective pivot piece 351 can be rotated out from either side of the wrist rest body 33. The wall plate 37 can then be rotated to the preset angle and fixed in place. Thus, the vertically positioned keyboard at two sides thereof is possible to rest against the wall plate 37 respectively.

It is appreciated that, by using the wrist rest of the present invention, the interior space of the wrist rest body 23, 33 can receive and store up the keyboard vertically. Meanwhile, these components can be extended out in use so that the present invention is able to create new functionality of a wrist rest provided in a keyboard under a condition of saving space. In addition, the problem related to the storage of the keyboard can be solved to avoid the inconvenience result from the keyboard still occupying the desktop space at the time of the computer being not in use.

While the invention has been described with reference to the a preferred embodiment thereof, it is to be understood that modifications or variations may be easily made without departing from the spirit of this invention, which is defined by the appended claims.

What is claimed is:

1. A wrist rest capable of vertically storing up keyboard, comprising:
    a wrist rest body;
    at least a movable piece, being kept in an interior of the wrist rest body and being movable by either sliding out of the wrist rest body or by pivoting away from the wrist rest body; and
    at least one wall plate, being pivotally connected to the movable piece, being able to rotate a preset angle and held in position;
    whereby, the keyboard can rest against the wall plate, which has been rotated to the preset angle.

2. The wrist rest for keyboard as defined in claim 1, wherein the movable piece is a slide piece that slides out horizontally from the wrist rest body.

3. The wrist rest for keyboard as defined in claim 2, wherein the slide piece comprises a first slide piece, which is pivotally connected to the wrist rest body, and a second slide piece, which is pivotally connected to the first slide piece.

4. The wrist rest for keyboard as defined in claim 3, wherein the wall plate is pivotally connected to the second slide piece.

5. The wrist rest for keyboard as defined in claim 1, wherein the movable piece is a pivot piece that rotates out from the wrist rest body.

6. The wrist rest for keyboard as defined in claim 5, wherein the wall plate is pivotally connected to the pivot piece.

7. The wrist rest for keyboard as defined in claim 1, wherein the preset angle is 90 degrees.

* * * * *